April 8, 1969   JAMES E. WEBB   3,437,527
ADMINISTRATOR OF THE NATIONAL AERONAUTICS
AND SPACE ADMINISTRATION
METHOD FOR PRODUCING A SOLAR CELL HAVING AN
INTEGRAL PROTECTIVE COVERING
Filed Oct. 26, 1966

INVENTOR
Peter A. Iles

BY

ATTORNEYS

3,437,527
METHOD FOR PRODUCING A SOLAR CELL HAVING AN INTEGRAL PROTECTIVE COVERING
James E. Webb, Administrator of the National Aeronautics and Space Administration, with respect to an invention of Peter A. Iles, Arcadia, Calif.
Filed Oct. 26, 1966, Ser. No. 590,141
Int. Cl. H01m 15/00
U.S. Cl. 136—89                                                  6 Claims The invention described herein was made in the performance of work under a NASA contract and is subject to the provisions of section 305 of the National Aeronautics and Space Act of 1958, Public Law 85–568 (72 Stat. 435; 42 U.S.C. 2457).

This invention relates to the fabrication of semiconductor devices and, more particularly to a method of fabricating a more efficient solar cell.

On satellite missions of fairly long duration, secondary power for gathering or sending information has generally been supplied by solar cell arrays. A typical present day supply uses several thousand silicon solar cells of closely controlled and matched characteristics, each cell with conversion efficiency, measured under equivalent space sunlight, of above eleven percent. The cells are attached to a light, strong substrate such as aluminum honeycomb, bearing printed circuit contacts which interconnect the solar cells in series and parallel with pick-off points to supply the various power needs. Chemical batteries are recharged by the solar cells and provide power storage. This combination has proved reliable under the stresses of launching and continued operation in the space environment.

Three problems are peculiar to the space environment, namely: thermal control, micrometeroite erosion, and radiation effects. Since the only heat loss in space is by radiation, the equilibrium temperature of a satellite is determined by the overall ratio of absorptivity to emissivity of the stellite surface. In the cases where much of this surface is covered with solar cells, the properties of the cell surfaces have a large influence on the satellite temperature. Also, because cell output decreases as the temperature increases, the cell ratio of absorptivity to emissivity should be as low as possible. Micrometeorites striking the spacecraft erode or remove thin layers of the satellite outer surface. This could degrade a thin coating used for passive temperature control. Also, solar cells are very susceptible to such impacts, both because of their thin antireflecting coating, and also because the PN junction responsible for energy conversion is very shallow in cells optimized for high output in space. Additionally, the space solar spectrum is rich in ultraviolet radiation, and there may be large fluxes of electrons and/or protons, particularly in the radiation belt surrounding the earth. Both charged and uncharged radiation can affect dielectric properties, and the particles can produce damage in the semiconductor used in the solar cells thereby reducing cell output.

Silicon has proved to be the most available and economical semiconductor for use in solar cell fabrication; however, the thermal emittance of silicon is low, and the best way to decrease the absorptivity to emissivity ratio is to cover the cells with highly emitting, optically transparent covers such as glass or quartz. The covers used for thermal control can also protect against large scale deterioration from micrometeorites. Further, the transparent shields are useful in minimizing deterioration from radiation. The thickness of the shield needed for this purpose varies according to the density and energy of the particles encountered. By suitable choice of the thickness and nature of the transparent covers solar cells have coped well with the above problems for the operating conditions in many different orbits.

Three methods have been used to hold the covers over the cells. Early satellites such as the Vanguard I used thick quartz covers (65 mils) held on the cells with a housing and a gasket seal. These covers were used before radiation damage was expected and were intended mainly for micrometeorite protection. A second method most commonly used relied on bonding with a thin layer of adhesive. Adhesive systems presently used are elastomeric in nature and have good transmission over the spectral range where the cells are sensitive. By these means thin glass slides (6 mils) for temperature control, and thick quartz slices (up to 60 mils) for additional radiation protection have been bonded to the cell surfaces. Another method was employed in the Telstar power supplies. This method eliminated the adhesive, and used a 30 mil sapphire cover fused to platinum supports. This method is more complex and expensive than the others.

The adhesive bonding technique provides good cell temperature control and is versatile in that a wide range of radiation protection is acquired. However, since most adhesives darken under the enhanced ultraviolet radiation, the reliability of the cell plus cover combination must be increased by applying an ultraviolet rejection filter of many alternate dielectric layers evaporated with carefully controlled thicknesses. The resultant system is expensive and when assembly costs are included the cover cost can often predominate in the completed solar array. Additionally, despite much effort in adhesive selection, the adhesive sets the limit on mechanical strength and environmental performance, particularly on the possibility of high temperature storage or operation. The bonded covers, especially those of thin glass, are fragile and this complicates array assembly. The fragility adds much difficulty in providing covers thinner than 6 mils. For some missions such thinner covers are sufficient and are of advantage in reducing the weight of the power supply.

The use of integral coatings on solar cells offers the chance of offsetting the above disadvantages. However, attempts at applying integral coatings to the cells have been largely unsuccessful. These trials included the growth of silicon dioxide films onto silicon by thermal oxidation, by pyrolytic decomposition of silanes by evaporation, and by sputtering. These methods generally gave slow layer formation rates, often required very high temperatures, and when the layers were thicker than 2 microns, the severe mismatch led to cracking of the silicon dioxide. Layers of organic materials like epoxies or elastomers were successfully applied, but present planning for space missions rules out this type coating because of the high chance of ultraviolet and vacuum degradation. Early attempts to fuse borosilicate glasses did not give a layer of good transparency because, it is now realized, the experimental techniques were inadequate. The fusing operation requires high temperatures which can cause harmful side effects. Stable electrical contacts must be applied to the cells. The heat of fusion can destroy these contacts by allowing the metal to move into the semiconductor or to short through the PN junction.

It is therefore an object of the present invention to develop an improved method of producing a solar cell having an integral protective covering which increases the efficiency of the cell in high temperature applications such as space probes and satelllite missions.

It is a further object of the invention to develop a solar cell having an integral protective covering which improves the efficiency of the cell by increasing its thermal emittance.

Briefly stated, the method of the invention comprises the inclusion of a thin dielectric layer between the diffused surface of the semiconductor and the evaporated metal contacts. By carefully controlling the thickness of the metal and the dielectric layers it is possible during the final glass fusion step to allow the metal contacts to penetrate the dielectric layer and make ohmic contact with the diffused layer of the semiconductor, while further penetration of the diffused layer is retarded. This application is an improvement of my copending application entitled, "Solar Cell Coating," Ser. No. 537,160, filed Mar. 24, 1966.

Other objects and features of the invention will become apparent to those skilled in the art as the disclosure is made in the following description of a preferred embodiment of the invention as illustrated in the accompanying sheets of drawings, in which.

Figure 1:
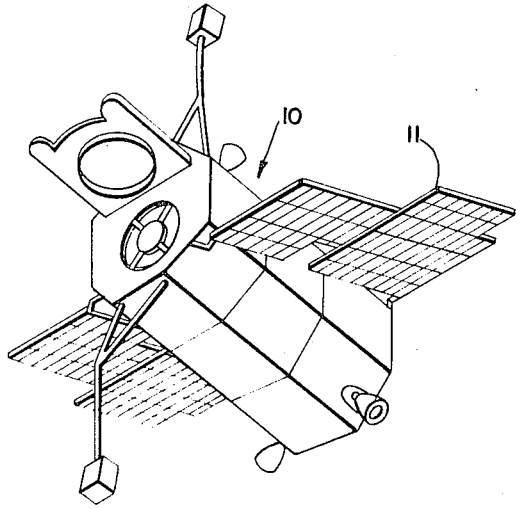
FIGURE 1 is a diagrammatic view of a space vehicle powered by solar arrays.

FIGURE 1 depicts a spacecraft 10 which is in this instance a diagrammatic showing of the Orbiting Astronomical Observatory developed by the National Aeronautics and Space Administration to collect in orbit scientific data from the stars and galaxies. This spacecraft depends for its operating power on panels 11 of glass-covered silicon solar cells which converts the sun's radiant energy into electrical energy which is stored in nickel cadmium batteries within the craft. The solar panels of this satellite are covered with more than 74,000 such solar cells which could be produced by the method of this invention.

Figure 2:
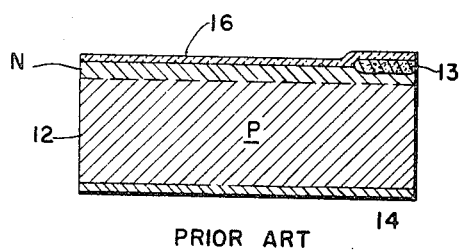
FIGURE 2 is a sectional view of a solar cell produced by known methods.

FIGURE 2 shows a silicon solar cell produced by known methods. A P-silicon slice 12 is diffused in phosphorus to form a shallow N-type skin of a depth, for example, not greater than 0.5 micron. After the diffusion all surfaces are then thoroughly cleaned, as by treatment in concentrated hydrofluoric acid to remove any surface impurities or oxide coating. All the diffused N-type surfaces save the top may then be removed by lapping or mechanical abrasion. The surface is then masked in a suitable fashion and metal contacts 13 and 14 are deposited onto the upper and lower surfaces in the unmasked regions. An integral glass coating 16 is then formed by spraying, depositing, or brushing glass particles onto the upper surface and then heating the assembly above the fusion temperature of the glass, usually a temperature in excess of 600° C. for a time greater than fifteen minutes. Experience has shown that even where non-alloying metal contacts, such as titanium-silver, are used some penetration of the shallow diffused N-type layer takes place during the fusion step.

Figure 3:
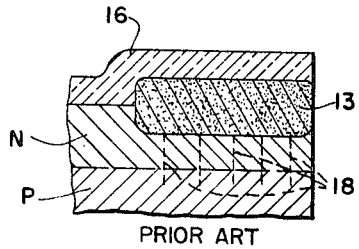
FIGURE 3 is an enlarged fragmentary view of a portion of FIGURE 2.

FIGURE 3 is an enlarged fragmentary view taken in the area of metal contact 13 as illustrated in FIGURE 2. The heat of fusion generated in applying glass layer 16 has caused the metal of contact 13 to diffuse into the N-type region of the cell. This diffusion when severe can penetrate into the P-N junction as illustrated by the shorting paths at 18. Penetration may occur by separate metal particles or atoms. The resultant degradation reduces cell efficiency and can render the cell useless by shorting the junction.

In order to obtain an acceptable integral glass coating it is necessary to fuse glass layers at temperatures ranging from 750° C. to 950° C. with the metal contacts in place. The method of this invention, as set out hereinafter, achieves this fusion without the undesirable diffusion of the contact metal into the P-N junction which has hitherto taken place and at the same time retains all the advantages inherent in the use of integral glass covers.

Figure 4:
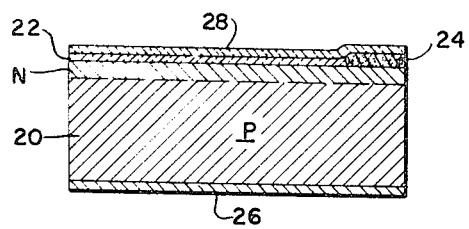
FIGURE 4 is a sectional view of a solar cell produced by the method of this invention.
Figure 5:
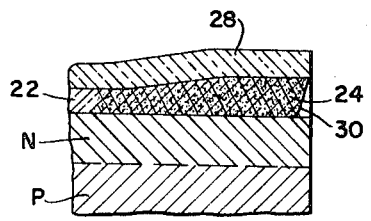
FIGURE 5 is an enlarged fragmentary view of a portion of FIGURE 4.

Referring to FIGURES 4 and 5, a P-silicon slice 20 is diffused or doped with phosphorus in an oxidizing atmosphere, such as phosphorus pentoxide vapor carrier in oxygen, forming a shallow N-type skin approximately 0.3 micron deep plus a phosphoro-silicate glass layer 22 approximately 0.3 micron thick. All the diffused N-type surfaces of the slice 20 save the top are then removed by lapping or mechanical abrasion. With respect to the top surface note that the phosphoro-silicate glass layer 22 is left in place and not removed as in the known methods. The cell is then masked and titanium-silver contact 24 is evaporated over the phosphoro-silicate glass layer 22. Titanium improves the bonding characteristics of the contacts, and silver serves as a good electrical conductor. The thickness of the metal layers is not critical; for example, in this embodiment the titanium layer may range from 500 to 3000 angstroms and the silver layer may be 0.5 to 5.0 microns.

Glass powder is then deposited onto the silicon slice and fused to form the integral layer 28 in a manner more completely described hereinafter. By controlling the thickness of the metal contacts and the glass dielectric layers it is possible during the final fusion cycle to allow the metal contacts to penetrate the dielectric layer and establish ohmic contact with the diffused N-type layer. This diffusion of contact metal is shown at 30 in FIGURE 5. Thus, the metal of the contact 24 has diffused into the dielectric glass layer 22 to establish electrical contact with the semiconductor.

The back surface of the slice is then sandblasted, titanium-silver contact 26 is deposited thereon, and the PN junction is etched clean. To allow for subsequent electrical connection with the contact 24 a portion of the deposited glass powder may be removed in the vicinity of the contact prior to the fusion step. The cell thus formed is ready for incorporation into an array for solar energy conversion.

Preparation of the glass coating will now be described in more detail. As usual in glass technology, the choice of the best glass is a compromise between several requirements, some conflicting. The glass should have a thermal coefficient of expansion well matched to that of silicon over a fairly wide temperature range, should be of as low a fusion temperature as possible, with good optical transmission when fused, have high thermal emittance and be stable under irradiation. The easiest requirement to meet is that of high thermal emittance, which is the case for most glasses. At first, zinc alumino-borosilicate glasses were used, because by change of composition these glasses could have expansion coefficients for 0° C. to 300° C., in the range 38 to 45 times $10^{-7}$ per ° C., with fusing temperatures in the range 640° C.–750° C. However, these glasses have serious disadvantages, particularly in low transmission, chemical attack by plating solutions, and limited fusing properties. Satisfactory layers thicker than 8 microns are difficult to fuse, and excessive bubbles form in the glass if the fusing temperature exceeds 700° C. by a small amount. Borosilicate glasses thermally matched to silicon (for example, Corning glasses 7070, 7720, 7040, and 7740) give successful results, and have some advantages over the more complex glasses. In particular, these glasses have higher optical transmission, their fusing temperature ranges are less critical, and thicker layers of good quality can be applied.

The borosilicate glass used is broken into small pieces and powdered using either an alumina ball mill, or a ceramic rolling mill. The fine glass is prevented from coagulating by dispersing it in isopropyl alcohol, a liquid of high dielectric constant. In order to provide some degree of coagulation when the glass is deposited onto the silicon a dense liquid, ethyl acetate, of low dielectric constant is mixed with the alcohol, so that the glass leaving this heavier liquid adheres weakly to the silicon. The size-range and density of the glass particles are controlled, to aid fusion and thickness control.

Next, clean slices of silicon are placed in a beaker and the slurry is poured over the slices. The beaker is spun in a centrifuge at high speed (3,000 r.p.m.) for three minutes, and the glass powder is thrown onto the silicon. The slices are removed from the beaker carefully to avoid disturbing the lightly adhering glass layer. The liquids dry quickly leaving a matte, white glass layer. This layer is fused as soon as possible. One slight variation is possible at this stage. To reduce thickness variations, especially at the edges of the slice, a small volume of dense liquid with dielectric constant lower than that of ethyl acetate, for example trichloroethylene, can be injected into the bottom of the beaker before centrifuging.

The fusing cycle has to be a compromise. The optical qualities of the fused glass layers are found to improve as the temperature increases, as a result of more complete fusion, until a limit is reached where defects such as bubbles begin to appear in the layers. Borosilicate glasses give a wide temperature range where good fusion is possible (820° C. to 950° C.). The atmosphere used during fusion affects the glass layer, and generally an inert gas, such as nitrogen is used. The best fusing cycle is a rapid heating and cooling (15 seconds total) with a peak temperature between 820° C. and 950° C.

Referring again to FIGURES 4 and 5, it is thus seen that as a result of the above fusion process, an integral protective layer 28 of glass is applied to the slice 20 and at the same time the metal of contact 24 has diffused through the dielectric phosphoro-silicate glass layer 22 to establish ohmic contact with the N-type region.

It was found that second and later layers could be applied to the original glass layer. In these instances the bond between the already fused layer and the powder can be formed at slightly lower temperatures. No separate interfaces occur between the successive layers.

The integral coatings of this invention show promise for thermal control of solar cells in space missions where high radiation resistance is not required and thin slices are worth using to reduce weight. Such missions include deep space probes, lunar orbiting satellites, and earth satellites operating at low altitudes. The coating should still protect against low energy protons and may be useful for orbits approaching the sun, where high temperature must be tolerated. While prior conventional methods fail for covers thinner than 3 mils, the present method has successfully produced coatings of a thickness of 1 mil. Layers 1 mil thick have one-seventh the weight of the present 6 mil layers and the adhesive, and because the adhesive has been eliminated, the reliability of the cell array is increased.

Obviously, many modifications and variations of the invention are possible in light of the above teachings. The teachings developed are applicable to thin film cells made from gallium arsenide or silicon, and the resultant coatings are fairly flexible. It is possible, if necessary, to coat the edges of the cell with glass. Appreciable cost savings are realized because expensive optical filters are not necessary, and the complexity of the array assembly is reduced with these coated cells. The contacts developed in this work show promise for wider use where high temperatures are needed in semiconductor technology. The methods used could be adapted to the glass sintering process or for use in micro-circuit encapsulation.

What is claimed is:

1. A method for producing a solar cell having an integral protective covering comprising the steps of:
   doping the surface of a semiconductor slice of one of the conductivity types in an oxidizing atmosphere to create a diffused surface layer of the opposite conductivity type covered by a thin dielectric layer,
   removing the opposite conductivity type layer and dielectric layer from all but the top surface of the semiconductor slice,
   applying a metal contact to the top surface of the slice,
   depositing glass powder onto the top surface of the slice and over the metal contact,
   heating the slice to fuse the glass powder thereto and simultaneously diffusing the metal contact through the dielectric layer to establish ohmic contact with the diffused surface layer, and
   applying a second metal contact to the bottom surface of the slice.

2. The method of claim 1 wherein the semiconductor slice is of P-silicon and the doping agent is phosphorous, thereby forming a phosphoro-silicate dielectric glass layer on the diffused slice.

3. The method of claim 1 wherein the glass powder is a borosilicate glass and the heating step occurs within a range between 820° C. and 950° C.

4. The method of claim 3 wherein the heating step is followed by rapid cooling and wherein the entire heating and cooling cycle takes place in a period of approximately 15 seconds.

5. An improved solar cell comprising:
   a semiconductor slice of one of the conductivity types having a diffused surface layer of the opposite conductivity type,
   a thin dielectric layer covering said diffused surface layer,
   a metal contact diffused into said dielectric layer and in ohmic contact with said diffused surface layer,
   and an integral protective glass layer fused to said dielectric layer.

6. A solar cell according to claim 5 wherein:
   the semiconductor slice is of silicon and the diffused surface layer contains a phosphorus impurity,
   and the dielectric layer is phosphorosilicate glass.

References Cited

UNITED STATES PATENTS

| | | | |
|---|---|---|---|
| 3,091,555 | 5/1963 | Smythe | 136—89 |
| 3,104,991 | 9/1963 | MacDonald | 148—33.3 X |
| 3,323,956 | 6/1967 | Gee | 148—33.3 X |
| 3,361,594 | 1/1968 | Iles et al. | 136—89 |

WINSTON A. DOUGLAS, *Primary Examiner.*

M. J. ANDREWS, *Assistant Examiner.*

U.S. Cl. X.R.

29—572. 588